Figure 1:
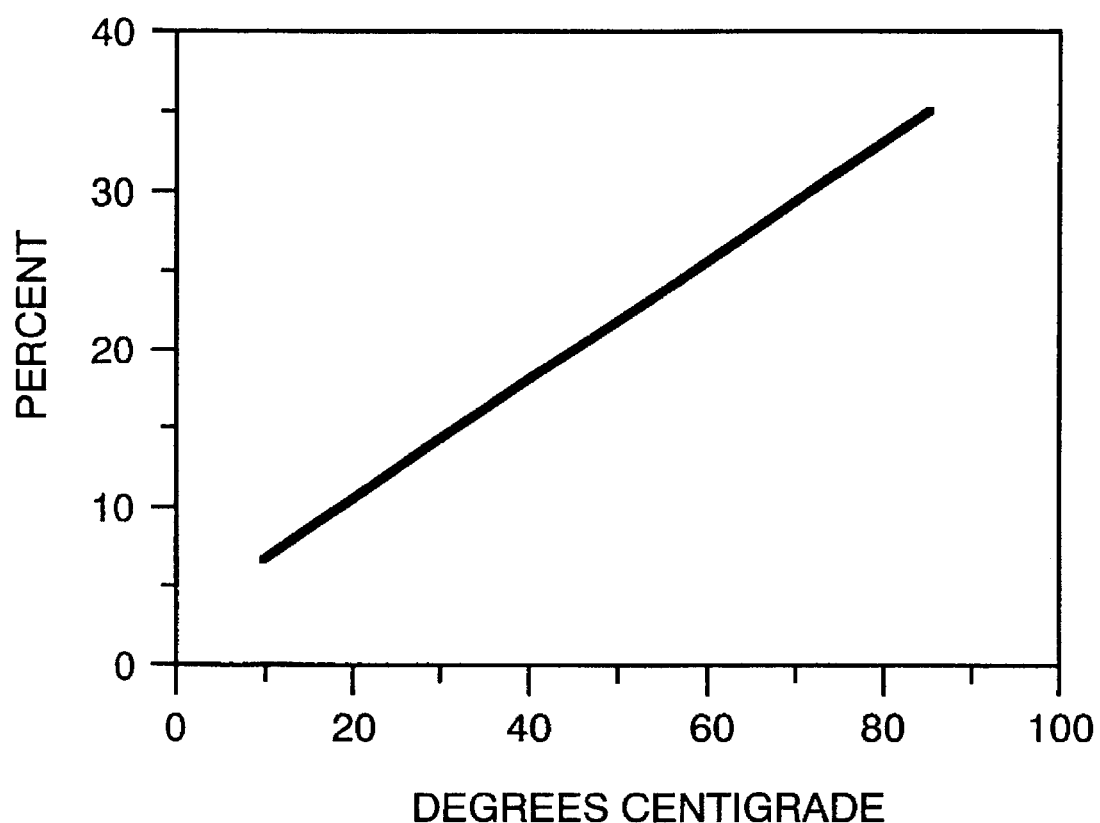

United States Patent [19]
Smits et al.

[11] Patent Number: 5,656,317
[45] Date of Patent: Aug. 12, 1997

[54] AGGLOMERATED COMPOSITION, PROCESS FOR PRODUCING IT AND FOOD PRODUCTS CONTAINING THE SAID COMPOSITION

[75] Inventors: Georges Smits; Luc Daenekindt, both of Gijzegem-Aalst; Karl Booten, Geetbets, all of Belgium

[73] Assignee: Raffinerie Tirlemontoise S.A., Belgium

[21] Appl. No.: 513,857

[22] PCT Filed: Mar. 3, 1994

[86] PCT No.: PCT/BE94/00019

§ 371 Date: Dec. 4, 1995

§ 102(e) Date: Dec. 4, 1995

[87] PCT Pub. No.: WO94/19973

PCT Pub. Date: Sep. 15, 1994

[30] Foreign Application Priority Data

Mar. 3, 1993 [BE] Belgium .............................. 09300210

[51] Int. Cl.$^6$ .................................................... A23P 1/02
[52] U.S. Cl. .................... 426/453; 426/565; 426/652; 426/653; 426/658; 426/577

[58] Field of Search ................................. 426/453, 658, 426/578, 652, 653, 577, 654, 565

[56] References Cited

U.S. PATENT DOCUMENTS

| | | | |
|---|---|---|---|
| 4,927,811 | 5/1990 | Quarles | 514/23 |
| 5,206,355 | 4/1993 | Richards | 536/4.1 |
| 5,527,556 | 6/1996 | Frippiat et al. | 426/573 |

*Primary Examiner*—Jeanette Hunter
*Attorney, Agent, or Firm*—Hayes, Soloway, Hennessey, Grossman & Hage, P.C.

[57] ABSTRACT

The invention relates to an agglomerated composition comprising at least one fructan exhibiting instant colloidal dispersion.

The invention also relates to a process for preparing the agglomerated composition, to a process for preparing a composition having a creamy structure using the said agglomerated composition, and to the creamy-structured composition thus obtained and the food products comprising the said compositions.

17 Claims, 2 Drawing Sheets

5,656,317

AGGLOMERATED COMPOSITION, PROCESS FOR PRODUCING IT AND FOOD PRODUCTS CONTAINING THE SAID COMPOSITION

SUBJECT OF THE INVENTION

The present invention relates to a new agglomerated composition intended in particular for the preparation of a composition having a creamy structure.

The invention also relates to a process for preparing the agglomerated composition, to a process for preparing a composition having a creamy structure using the said agglomerated composition, and to the said creamy-structured composition thus obtained and the food products comprising the said agglomerated compositions and/or having a creamy structure.

TECHNOLOGICAL BACKGROUND OF THE INVENTION

Within the context of a healthy and balanced diet, more related to our sedentary lifestyle, there is a need for food compositions which meet the requirements, on the one hand, for a reduced calorie, fat and sugar content and, on the other hand, for a high dietary fiber content and which promote the development of a beneficial intestinal flora.

These food compositions must, in addition, meet organoleptic qualities (appearance, texture, taste, mouth feel) which cannot be inferior to traditional foods.

Fructans such as inulin can meet these requirements.

Accordingly, the product RAFTILINE® was developed and marketed by Raffinerie Tirlemontoise. RAFTILINE® has advantageous nutritional properties which make it possible to satisfy the requirements of a balanced diet as set forth above. Its bifidogenic effect, its behavior as dietary fiber and its very low calorific value ($\approx 1$ kcal/g) may be mentioned.

From the organoleptic point of view, RAFTILINE® is characterized by a slightly sweet taste (10% of that of sucrose) without aftertaste and by a neutral odor.

One of the functional properties of RAFTILINE® which limits its use in the abovementioned food compositions is its solubility.

RAFTILINE® contains inulin, a substance which can be easily obtained from many widely distributed plants, more specifically in the case of RAFTILINE®, from the chicory Cichorium intybus.

Inulin is a polydispersed composition of saccharides of general formula GFn (G=glucose, F=fructose, n=number of linked fructose units ($n \geq 2$), the fructose units being linked to each other essentially by $\beta(2 \rightarrow 1)$ bonds.

Being a mixture of molecules of different lengths, the degree of polymerization (DP=n+1) of chicory inulin varies from 2 to more than 60.

The degree of polymerization is an important parameter since it influences the solubility of inulin.

RAFTILINE® is very sparingly soluble. Dissolution of inulin depends on the desired final concentration and the temperature. Thus, for example, complete dissolution occurs only at temperatures greater than 85° C. At 60° C., an aqueous solution may be obtained containing 25% inulin. However, at room temperature, only about 10% of inulin having a mean DP of about 9 can be dissolved in water.

The accompany FIG. 1 represents the curve of solubility of RAFTILINE® ST as a function of the temperature.

It is therefore practically impossible to add concentrated inulin solutions to food preparations.

One alternative consists in the incorporation of inulin in powdered form but the disadvantage of this is that the food products obtained often have a sandy texture. Furthermore, it is often very difficult, if not impossible, to add large quantities of inulin powder to food products such that the inulin is evenly dispersed therein. The formation of lumps and the appearance of a deposit is for example observed.

In order to overcome these disadvantages, the Applicant has developed and described in the patent application published under the Ser. No. WO93/06744, compositions having a creamy structure and comprising fructan or a mixture of fructans (e.g. RAFTILINE®) and a liquid. The fructans are the essential element for the formation of the said creamy structure. The patent application also describes the process for preparing these compositions and their use.

These compositions having a creamy structure are only obtained by subjecting the fructan(s) and the liquid to high shearing forces.

A range of creams can thus be prepared whose inulin concentrations vary from 5 to 85% or more, and preferably from 20 to 50%.

However, in order to provide high shearing forces, these preparation processes require the use of mixers, ultrasound reactors, ball mills, homogenizers, colloid mills and/or high speed shearing appliances such as hydroshear or an Ultra-Turrax®.

Such appliances are often expensive and difficult to use when large volumes of "cream" have to be produced.

Furthermore, during the preparation of the creamy-structured composition, deposits and/or lumps may form inside the composition and/or on the shearing appliances, which disrupts the organoleptic properties of the food products into which the said composition is incorporated and/or makes their preparation difficult.

In the food sector, an agglomerated composition which results from an agglomeration process is generally called a "soluble product" or alternatively a "minute product". The food product which is obtained after a liquid has been added is often called an "instant" product.

Thus, instant food products in liquid form comprising inulin are known.

In the case of "soluble tea" as described in the document EP-524,484, the inulin is used as support material for the flavor components and other extracts of the raw material. In instant tea, the inulin can be solubilized.

FIBRULINE® Instant is also known (Cosucra, Belgium). It is a powdered inulin composition which has a larger mean grain size than the standard powdered FIBRULINE® (Cosucra, Belgium) and which is reportedly easier to solubilize.

AIMS OF THE INVENTION

The present invention relates to a new agglomerated composition comprising a fructan or a mixture of fructans which, when the said composition is mixed with a liquid such as water, instantly forms a homogeneous colloidal dispersion, and then a homogeneous creamy structure, with comparable or enhanced organoleptic properties compared with the properties of the creamy-structured compositions of the state of the art.

Another aim of the present invention is to obtain a homogeneous dispersion of the said composition at high fructan concentrations, of the order of 20 to 50%, which are greater than the concentration corresponding to the solubility point in water.

A further aim of the present invention is to provide a composition which makes it possible to prepare a composition having a smooth and homogeneous creamy structure by mixing with water without having to subject this mixture to high shearing forces by the devices of the state of the art.

The present invention is also aimed at developing a process for preparing the said agglomerated composition as well as a new process for preparing a composition having a creamy structure with the aid of the said agglomerated composition.

CHARACTERISTIC FEATURES OF THE INVENTION

The present invention relates to a new agglomerated composition comprising at least one fructan exhibiting instant colloidal dispersion, which forms a creamy structure.

Agglomerated composition is understood to mean the product which results from an agglomeration performed in order to increase the size of the grains (the particle size) of a product already in powdered form. Given that products in powdered form have a tendency to be hydrophobic, the agglomeration enhances their immediate and instant dispersion in water. The agglomerates are slightly linked structures with empty spaces which give the impression of a foam.

Thus, an agglomerated composition distinguishes itself by the larger mean size of the grains.

Instant colloidal dispersion is understood to mean the fact that the said agglomerated compositions become immediately and therefore instantly dispersed in water in concentration regions above the solubility point. A two-phase system is thereby obtained of which one comprises the colloids (dispersed phase) distributed throughout the bulk substance (continuous phase) which is the liquid.

The compositions having a creamy structure which form with the aid of the agglomerated compositions according to the invention are stable and homogeneous; they do not exhibit deposition, or flocculation, or separation into two layers, and this even under a physical action. The compositions having a creamy structure retain their homogeneous texture when they are heated to temperatures at which the fructan or the mixture of fructans is not completely or perfectly solubilized.

The appearance and consistency of the composition having a creamy structure may vary widely, for example between the appearance and consistency of a dressing type sauce (very viscous liquid) and the appearance and consistency of a cosmetic cream or of margarine, and even up to the hardest form of cold butter. However, these compositions have a fatty and creamy mouth feel comparable to the organoleptic properties of the compositions having a creamy structure which are described in the document WO93/06744, which document is incorporated into the present patent application by way of reference. The compositions do not give the impression of being sandy.

Preferably, the fructan present in the agglomerated composition is a linear fructan, a branched fructan or a partially hydrolyzed fructan.

Advantageously, the said fructan is inulin.

The invention also relates to a process for preparing the said agglomerated composition which consists in wetting a fructan or a mixture of fructans in powdered form or in granule form with the aid of water in liquid phase or in vapor phase, in an agglomeration chamber in the presence of hot air, and then in cooling and in sieving the agglomerated composition in order to retain the product of suitable particle size, while recycling the compositions which are too fine and the oversized agglomerates.

Advantageously, between 40 and 90% by weight of water relative to the fructan and/or to the mixture of fructans is measured out into a vertical agglomeration chamber, the temperature prevailing in this chamber being between 70° C. and 100° C.; the holding time in the said agglomeration chamber being of the order of a few tens of seconds.

Preferably, during the drying, the moisture content of the product is reduced down to a value less than 5%.

The cooling and the separation of the agglomerates according to the invention are advantageously performed with the aid of a fluidized bed. The fluidized bed may also serve for a final drying of the agglomerates leaving the agglomeration chamber.

Figure 2:
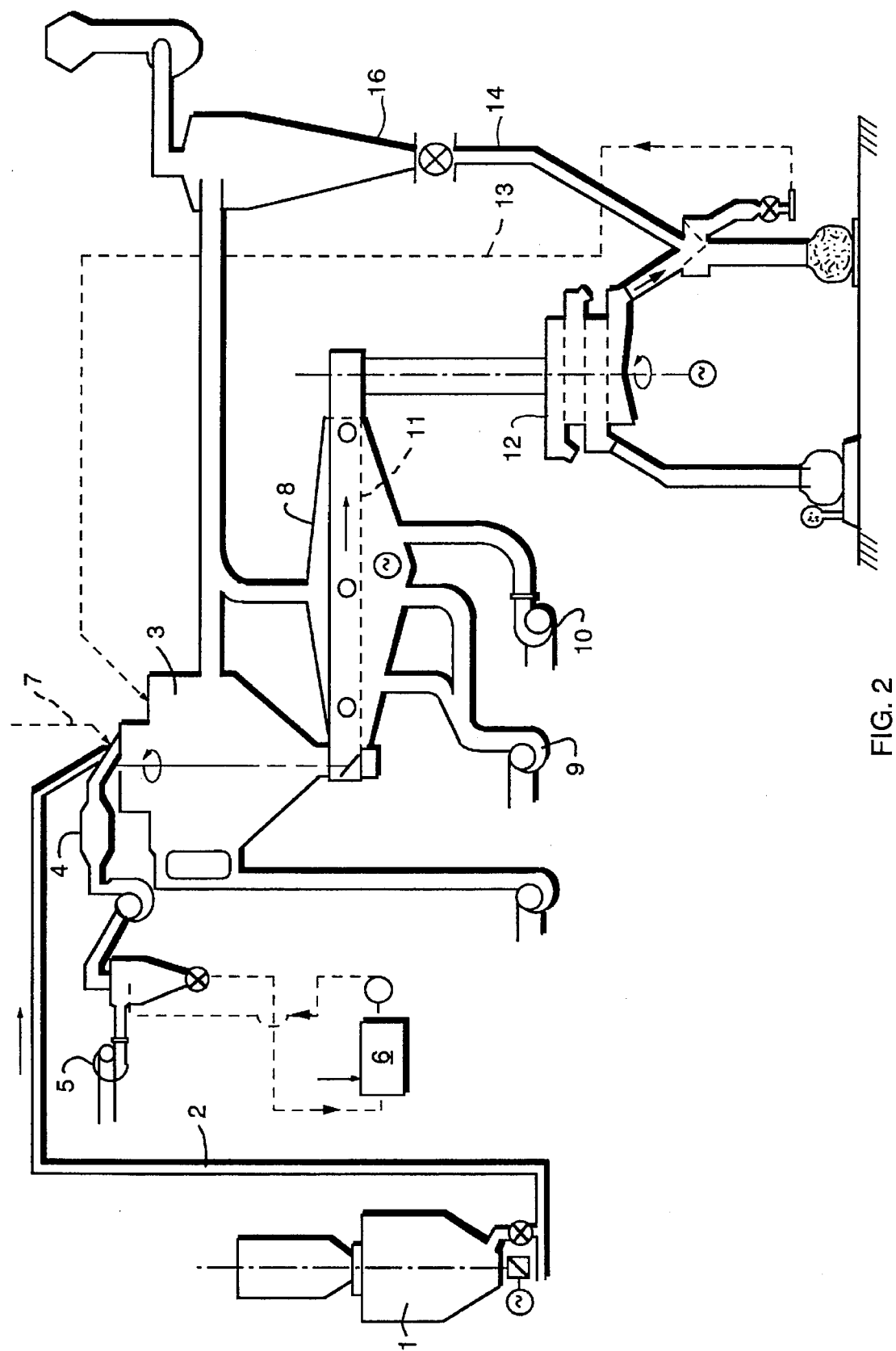

Another preparation process can be performed in a plant which is schematically represented in the accompanying FIG. 2. Such a plant is already described for the preparation of sucrose-based products containing sweeteners with a high sweetening power, in patent application Ser. No. WO-89/09287, which is also included in the present application by way of reference.

Optionally, the preparation of an agglomerated composition can be performed continuously. To this end, the fructan, or the mixture of fructans, is introduced into the agglomeration chamber in the form of a solution. The fines and the oversized agglomerates which leave the chamber are recycled into the chamber and wetted with the solution of fructan(s) introduced continuously. Thus, it will be the recycled fines and oversized agglomerates which will be the starting material for the preparation of an agglomerated composition according to the invention and which are comparable to the powder or to the granules of the preparation process described above.

Preferably, the solution of fructan(s) administered continuously comprises inulin in a concentration region which may vary from 1 to 50% on a dry matter basis.

Another aspect of the invention relates to a new process for preparing a composition having a creamy structure in which the agglomerated composition according to the invention and a liquid such as water, milk, egg white, egg yolk, sucrose syrup and the like are mixed, preferably with stirring.

Preferably, between 250 and 1000 g of the agglomerated composition according to the invention are mixed per liter of liquid in order to obtain a concentration of the order of 20 to 50% by weight.

Thus, the invention also relates to a composition having a creamy structure obtained using the agglomerated composition according to the invention and more particularly that obtained by the process described above.

A final aspect of the invention relates to a food product which comprises an agglomerated composition according to the invention and/or a composition having a creamy structure obtained according to the process of the invention.

It is evident that other substances may be added, simply by dry mixing, either to the initial fructans, or to the agglomerated composition or alternatively during the preparation of the food product.

Thus, colorings, preservatives, antioxidants taste enhancers, flavorings and sweeteners may be added.

In the various preparation processes according to the invention, these substances may also be incorporated into the fructan solution used to prepare the initial powdered composition and in the liquid phase used for wetting or alternatively in the liquid used to prepare the creamy composition according to the invention.

By way of illustration, the invention will be described in greater detail with the aid of the following examples.

EXAMPLE I

RAFTILINE® ST (in powdered form) and/or RAFTILINE® GR (in granule form) is introduced into a storage reservoir 1 (reference should be made to the accompanying FIG. 2) from which it is collected via the conduit 2 and introduced into a vertical agglomeration chamber 3.

Steam-heated air, at a temperature of between 70° C. and 100° C., is introduced into this chamber via the conduit 4, the steam being produced by suitable plants.

In this case, the air, which is heated by the heating device 6, is propelled by the ventilator 5 over the rotating plate placed at the top of the chamber. The wetting is performed by means of the steam injected via the conduit 7.

The material is kept suspended in the agglomeration chamber in a humid atmosphere and the particles agglomerate with each other.

In the first part of a dryer/cooler 8, supplied with hot air at 120° C. by a blower 9, the drying is performed by dry air blown at the bottom and through a belt 11 which transports the material from one end of the chamber 8 to another.

Next, the material is cooled in the second part of the chamber 8, supplied by the blower 10, the cooling being performed with cold air, this time blown at the bottom and through the belt 11.

The desired particle size is obtained by sieving on a sieve 12. The fine agglomerates separated are recycled via the conduit 13 to the chamber 3.

Provision is also made for collecting air both at the outlet of the chamber 3 and of the dryer/cooler 8. The air, which necessarily entrains the fine agglomerates, is collected in the conduit 15, the fines are separated in the cyclone 16 and recycled via the conduits 13 and 14 as indicated.

The hourly capacity of this plant is of the order of 300 kg of product.

Starting with RAFTILINE® GR, respectively with RAFTILINE® ST, agglomerated compositions called RAFTILINE® GRI, respectively RAFTILINE® GRI* are obtained by the said process.

EXAMPLE II

According to another form of the present invention, cold water is used in a vertical agglomeration chamber as wetting agent instead of steam in the above-mentioned plant and an agglomerated product called RAFTILINE® GRS is obtained starting with RAFTILINE® ST.

The agglomerated compositions, which are obtained according to the abovementioned process, differ from RAFTILINE® ST and GR in that they have a larger mean grain size.

The accompanying Table 1 presents, by way of illustration, the values for the particle size analyses of the different types of commercially available inulins. These analyses were performed on a 100 g sample with the aid of standard sieves according to the DIN 4188 standard and the results expressed as cumulative percentage.

With a liquid, RAFTILINE® GRI, GRI* and GRS form creamy compositions without having recourse to high shearing forces as illustrated by the examples of preparation which are set forth below.

RAFTILINE® ST and GR, like FIBRULINE® Instant, do not give rise to the formation of compositions having a creamy structure according to the invention.

EXAMPLE III

Pour all at once 30 g of RAFTILINE® GRI or RAFTILINE® GRI* or RAFTILINE® GRS into a beaker containing 70 cm$^3$ of water at room temperature. Mix the water and the inulin by imparting a swirling motion to the beaker manually. No deposit is produced, in contrast to what happens when RAFTILINE® ST, GR or FIBRULINE® Instant is used.

EXAMPLE IV

Pour, in small quantities, 30 g of RAFTILINE® GRI or RAFTILINE® GRI* or RAFTILINE® GRS into a beaker containing 70 cm$^3$ of water at room temperature, while mixing with the aid of a spoon. No deposit is formed, in contrast to what happens when RAFTILINE® ST and GR, as well as FIBRULINE® Instant are used.

EXAMPLE V

Pour, in small quantities, 30 g of RAFTILINE® GRI or RAFTILINE® GRI* or RAFTILINE® GRS into a beaker containing 70 cm$^3$ of water at room temperature while mixing with the aid of a mechanical stirrer.

The formation of the cream as well as its physical and organoleptic characteristics are influenced by the starting material as well as by the mode of preparation of the cream used.

Thus, starting with RAFTILINE® GRI, and whatever the mode of preparation used among those mentioned above, a virtually immediate dispersion of the agglomerated composition within the liquid was observed, without the formation of lumps or deposits, with the formation of a stable creamy structure after standing for 2 to 3 hours at room temperature.

The formation of inulin creams according to the present invention therefore has a significant advantage compared with the processes described in patent application Ser. No. PCT/BE92/00042 in the name of Raffinerie Tirlemontoise and which involve high shearing force.

As regards the physical properties of the inulin creams, these are influenced by the type of inulin which is agglomerated, the type of agglomerated composition used and by the mode of preparation of the cream. Thus, for example, the effect of these parameters on the hardness of the cream is illustrated in the accompanying Table 2.

The hardness was measured with the aid of the Stevens LFRA Texture apparatus and analyzed using the following parameters:

speed: 0.2 mm/s
depth: 5 mm

The creams obtained according to the process which is the subject of the present invention have a smooth and brilliant appearance even more so in the case of creams prepared starting with RAFTILINE® GRI. Under the same conditions, RAFTILINE® ST and GR, as well as FIBRULINE® Instant do not give rise to the formation of creams.

As regards the organoleptic characteristics, the creams thus obtained have a fatty and creamy mouth feel, comparable to the organoleptic properties of the creams of the state of the art.

EXAMPLE VI

Mix for ice cream

This type of product is used to manufacture reconstituted ice cream compositions used in the preparation of ice creams of the "soft ice" type.

Add an emulsifier and flavorings to concentrated skimmed milk. Mix until a homogeneous mixture is obtained. Heat to 80° C. and maintain at this temperature for 30 seconds (pasteurization). Spray-dry the mixture and incorporate the RAFTILINE® GRI (or GRI*, or GRS) and the sugar by mixing.

While mixing the powder mix thus obtained with water in a 1:2 ratio, a preparation for ice cream of the "soft ice" type is obtained which is free of fat.

Composition of the Dry Powder (% by Weight)

| | |
|---|---|
| Sugar | 35.50 |
| Skimmed milk powder | 34.91 |
| RAFTILINE ® GRI/or GRI*/or GRS | 26.63 |
| Stabilizer (Grinsted Cremodan SE 30) | 1.48 |
| Vanilla flavoring (Silesia 111/8309280) | 1.18 |
| Cream flavoring (Quest Int. NN 07172) | 0.30 |

EXAMPLE VII

Preparation of fruits

Quantities to be Used

| | |
|---|---|
| Strawberries (10.5% D.M.) | 50 kg |
| RAFTILINE ® GRI (or GRI*, or GRS) | 20 kg |
| Sugar | 35 kg |
| Water | 12.5 liters |
| Pectin (Hercules Genu Pectin 150 USA-SAG | 0.50 kg |
| Citric acid (50%) | 0.50 liter |
| Flavoring/coloring | qs |

Preparation process

Partially reduce the strawberries to a puree. Add the sugar and the RAFTILINE® GRI or GRI* or GRS.

Mix with the aid of a mechanical mixer and bring to the boil. Add the pectin, dissolved in water at 60° C., and bring the whole to the boil while mixing until about 18.5 kg of water has been evaporated.

Remove from the source of heat and add the flavoring, the coloring and the citric acid (as late as possible). Package in jars.

Leave to cool at room temperature before closing the jars hermetically. Store in the refrigerator.

A fruit preparation is thus obtained whose calorific value is reduced by 25% compared with a standard preparation (based on 55% sugar).

Added for example to yoghurt or to low fat fromage frais to a level of the order of 20%, this fruit preparation offers a smoother texture and a creamier and oilier mouth feel than in the case where sugar alone is used in the fruit preparation.

EXAMPLE VIII

Frankfurter

Composition (% by Weight)

| | |
|---|---|
| Pork meat (20% fat) | 30 |
| Pork shoulder (50% fat) | 10 |
| Water | 40.80 |
| RAFTILINE ® GRI, or GRI* or GRS | 12.50 |
| Starch | 2.0 |
| Casein | 2.0 |
| Phosphate | 0.30 |
| Sodium nitrite | 1.30 |
| Ascorbic acid | 0.10 |
| Spices | 1.00 |

Preparation process

Add the salts and the water to the meat and grind the whole in a cutter until a homogeneous paste is obtained.

Then add the RAFTILINE® GRI, or GRI* or GRS, the casein and the starch and grind until the desired texture is obtained. Package the product and subject it to the following heat treatment:

drying: 60° C., 30 minutes smoking: 65° C., 35 minutes cooking: 80° C., 30 minutes cooling: 20° C., 5 minutes The sausages are stored at 4° C.

EXAMPLE IX

Biscuit filling

Composition (% by Weight)

| | |
|---|---|
| Sugar solution (63% dry matter) | 43.80 |
| Honey (80% dry matter) | 34.60 |
| RAFTILINE ® GRS | 21.60 |

Preparation process

Homogenize the sugar solution and the honey and pour the RAFTILINE® GRS while mixing with the aid of a spoon. Allow to stand. The filling thus prepared has a creamier and oilier mouth feel than a filling prepared without using RAFTILINE® GRS.

TABLE 1

| Grain size (mm) | RAFTILINE ® ST | RAFTILINE ® GR | FIBRULINE ® INSTANT | RAFTILINE ® GRI | RAFTILINE ® GRI | RAFTILINE ® GRS |
|---|---|---|---|---|---|---|
| >0.800 | | | 4.7 | 1.2 | 2.4 | 2.0 |
| >0.710 | | | 5.6 | 4.2 | 3.6 | 4.1 |
| >0.500 | | | 9.9 | 13.4 | 14 | 6.3 |
| >0.400 | | | 12.9 | 27 | 26.6 | 9.3 |
| >0.315 | | | 18.6 | 49 | 45.8 | 12.9 |
| >0.250 | | | 24.4 | 81.4 | 73 | 19 |
| >0.200 | | | 32.2 | 93.4 | 87.8 | 28.4 |
| >0.180 | | | 39.0 | 95.6 | 92.4 | 34.8 |
| >0.140 | | | 49.8 | 97.8 | 95.4 | 46.8 |
| >0.125 | 1.4 | 3.5 | 57.9 | 98.5 | 97.0 | 61.0 |

TABLE 1-continued

| Grain size (mm) | RAFTILINE® ST | RAFTILINE® GR | FIBRULINE® INSTANT | RAFTILINE® GRI | RAFTILINE® GRI | RAFTILINE® GRS |
|---|---|---|---|---|---|---|
| >0.100 | 4.4 | 12.5 | 77.5 | 99.2 | 98.4 | 81.6 |
| >0.071 | 35.4 | 49.3 | 95.4 | 99.7 | 99.6 | 99.3 |
| >0.050 | 65.0 | 72.7 | 97.4 | 99.8 | 100.0 | 99.8 |
| >0.040 | 82.2 | 83.9 | 97.4 | 99.9 | — | 99.9 |

TABLE 2

| Type of inulin | Concentration of inulin (%) | Mode of preparation | Hardness (g) |
|---|---|---|---|
| GRI | 30 | According to Example III | 80 |
| GRI | 30 | According to Example IV | 82 |
| GRI | 30 | According to Example V | 66 |
| GRI* | 30 | According to Example III | 122 |
| GRI* | 30 | According to Example IV | 118 |
| GRS | 30 | According to Example III | 11 |
| GRS | 30 | According to Example IV | 61 |
| GRS | 30 | According to Example V | 38 |

We claim:

1. An agglomerated composition suitable for forming a creamy structure comprising at least one instant colloidally dispersible fructan.

2. Composition according to claim 1 wherein the fructan is a linear fructan, a branched fructan and/or a partially hydrolyzed fructan.

3. Composition according to claim 1 wherein the fructan in inulin.

4. Process for preparing an agglomerated composition according to claim 1, which it consists in wetting particles of a fructan or a mixture of fructans in powdered form and/or in granule form with the aid of water in liquid phase or in vapor phase, in an agglomeration chamber in the presence of hot air, and then in cooling and in sieving the agglomerated composition in order to retain the agglomerates of suitable particle size, while recycling the particles which are too fine and the oversized agglomerates.

5. Process according to claim 4, wherein between 40 and 90% by weight of water relative to the fructan and/or to the mixture of fructans is measured out into the agglomeration chamber, the temperature prevailing in this chamber being between 70° C. and 100° C.; the holding time in the said agglomeration chamber being of the order of a few tens of seconds.

6. Process according to claim 4, wherein the fructan or the mixture of fructans is introduced into the agglomeration chamber in the form of a solution which is also used to wet the fines and the oversized aggregates recycled.

7. Process according to claim 4 wherein the fructan used is inulin, in concentration region of 1 to 50% dry matter.

8. Process according to claim 4 wherein during the final drying, the moisture content of the product is reduced down to a value less than 5%.

9. Process according to claim 4 wherein the final drying and the subsequent cooling are performed with the aid of a fluidized bed.

10. Process for preparing a composition having a creamy structure, wherein the agglomerated composition according to claim 1, is mixed with a liquid.

11. Process according to claim 10, wherein the mixing is performed with stirring.

12. Process according to claim 10, wherein between 250 and 1000 g of agglomerated composition are mixed per liter of liquid.

13. Composition having a creamy structure, obtained by the process according to claim 10.

14. Food product which it comprises the agglomerated composition according to claim 1.

15. Process for preparing a composition having a creamy structure, wherein the a composition obtained by the process according to claim 4 is mixed with a liquid.

16. Food product which it comprises an agglomerated composition obtained by the process of claim 6.

17. Food product which it comprises the composition having a creamy structure according to claim 13.

* * * * *

UNITED STATES PATENT AND TRADEMARK OFFICE
CERTIFICATE OF CORRECTION

PATENT NO. : 5,656,317
DATED : August 12, 1997
INVENTOR(S) : Georges SMITS; Luc DAENEKINDT and Karl BOOTEN It is certified that error appears in the above-indentified patent and that said Letters Patent is hereby corrected as shown below:

In claim 4, column 9, line 37, delete "it".

In claim 15, column 10, line 48, delete "a".

In claim 16, column 10, line 50, delete "it".

In claim 17, column 10, line 52, delete "it".

Signed and Sealed this

Eleventh Day of November, 1997

Attest:

BRUCE LEHMAN

*Attesting Officer*     *Commissioner of Patents and Trademarks*